Nov. 8, 1927.
F. H. LUNDGREN
SPEEDOMETER DRIVING MECHANISM
Filed March 16, 1927
1,648,489
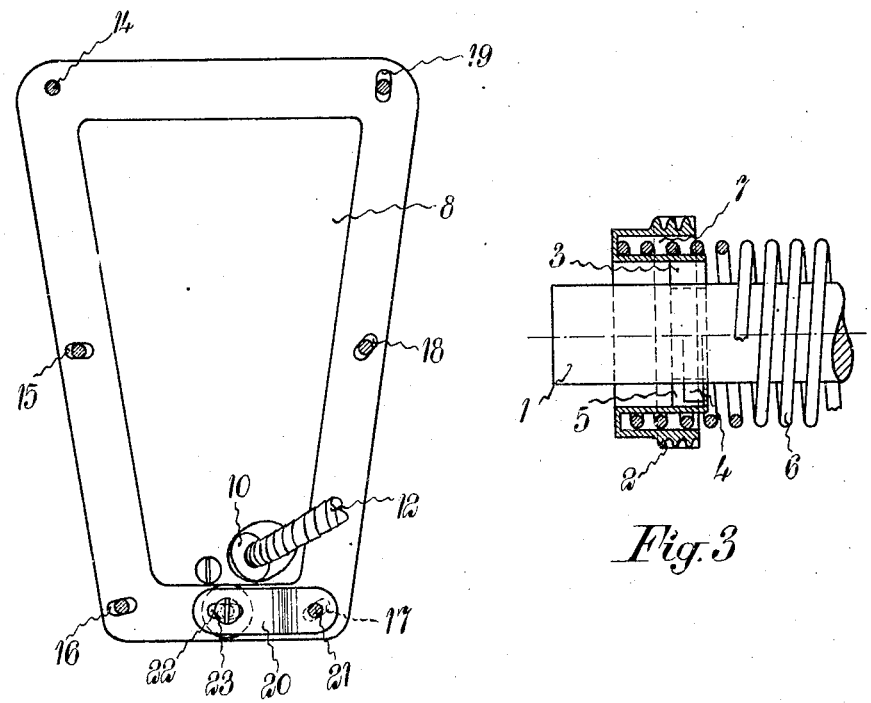
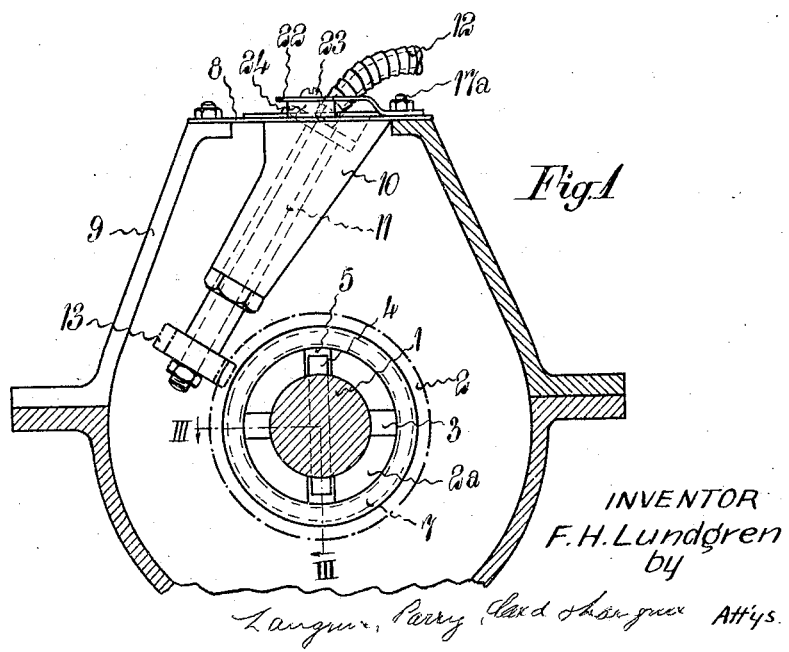
INVENTOR
F. H. Lundgren
by
Langner, Parry, Card & Langner Attys.

Patented Nov. 8, 1927.

1,648,489

UNITED STATES PATENT OFFICE.

FRIDOLV HERMAN LUNDGREN, OF INGELSTORP, GLEMMINGEBRO, SWEDEN, ASSIGNOR TO AKTIEBOLAGET ARKOS, OF LIDKOPING, SWEDEN, A CORPORATION OF SWEDEN.

SPEEDOMETER-DRIVING MECHANISM.

Application filed March 16, 1927, Serial No. 175,863, and in Sweden May 19, 1926.

This invention relates to a mechanism for driving speedometers, taximeters and the like apparatus attached to motor cars, especially of Ford type which lack in general a provision for driving such apparatus from the Cardan shaft.

The object of the invention is to avoid an alteration of the Cardan shaft and instead thereof to utilize the helical spring to be found in the gear case and arranged between the convential multiple disc clutch mounted on the driving shaft and a supporting washer. According to the invention a gear wheel is substituted for the supporting washer and is kept in place by means of the helical spring which presses the gear wheel against a pin extending through the driving shaft. The gear wheel is provided with a hub provided with axial slots and notches into which the said pin fits, so that the gear wheel is forced to follow the rotation of the driving shaft.

To the cover of the gear case is attached a bearing supporting a shaft which is connected at its one end to the flexible shaft leading to the apparatus to be driven and is provided at its other end with a gear wheel in mesh with the first named gear wheel on the driving shaft in the gear case. The detachable cover is provided with fixing holes of which all but one according to the invention have an arcuate form so as to enable a proper adjustment of the gearing to be made. The cover is further provided with a bracket fixed thereto by means of a screw and extending over one of the arcuate fixing holes of the cover, at which place the bracket has a circular hole, so that once the gearing has been properly adjusted the cover may be removed and replaced without a fresh adjustment becoming necessary.

The invention is illustrated by way of example in the accompanying drawing in which Fig. 1 is an end view, partly in section, of the driving mechanism according to the invention; Fig. 2 is a top view of the cover of the gear case and Fig. 3 is a section according to line III—III Fig. 1.

Referring to the drawing the conventional driving shaft 1 is provided with a transversal pin 4. The end of the shaft 1 is fitted with a worm wheel 2 having a hub $2^a$ which is provided with axial slots 3 and notches 5. The worm wheel 2 is pushed on the shaft 1 against the action of the helical spring 6 and so that the slots 3 pass over the protruding ends of the pin 4, whereafter the worm wheel is turned 90° so that the pin 4 engages the notches 5 and the helical spring 6 presses the worm wheel against the said pin. The worm wheel is further provided with a deep annular groove 7 for guiding the helical spring 6. In this manner the worm wheel replaces entirely the usual washer, and this is all that is required for providing a driving member on the driving shaft.

The detachable cover 8 of the gear case 9 is provided according to the invention with a bearing 10 supporting a shaft 11 which is connected at the one end to the flexible shaft 12 leading to the speedometer or the like and is provided at its other end with a worm 13 in engagement with the worm wheel 2. In order to be able to properly adjust the worm gear the one fixing hole 14 in the corner diagonally opposite to the position of the bearing 10 is circular, while all the other fixing holes 15, 16, 17, 18, 19 are in the form of arcuate slots, the hole 14 being the center for such arcs. Over the hole 17 near the bearing 10 is arranged a bracket 20 having a circular hole 21 which fits over the fixing bolt passing through the hole 17. The bracket 20 is further provided with a longitudinal hole 22 through which a screw 23 is screwed into a boss 24 fixed to the cover 8. When the worm gear is being adjusted the screw 23 is not properly screwed home, so that obviously the bracket 20 may be moved on account of its longitudinal hole 22 in relation to the cover 8, while its other end is kept with its hole 21 on the fixing bolt $17^a$ passing through the hole 17. After proper adjustment of the worm gear the screw 23 is screwed home, whereafter the cover may be removed and replaced without requiring a fresh adjustment of the worm gear, because the circular holes 14 and 21 always determine the proper engagement of the worm wheel 2 with the worm 13.

What I claim and desire to secure by Letters Patent is:—

1. A speedometer-driving mechanism having, in combination, a gear case, a driving shaft mounted in the gear case, a transversal pin passing through the driving shaft, a helical spring, a worm wheel having a deep annular groove for the helical spring and provided with a hub having axial slots and axial notches, the slots permitting the hub to be pushed on the driving shaft over the transversal pin and the notches engaging the transversal pin upon the worm wheel having been turned 90°, the said helical spring keeping the worm wheel hub with the notches in engagement with the pin, a detachable cover having a bearing supporting a shaft, the said shaft connected at the one end to a speedometer drive shaft, and a worm at the other end of said shaft, said worm meshing with the said worm wheel.

2. A speedometer-driving mechanism having, in combination, a gear case, a driving shaft journalled therein, a detachable worm wheel mounted on the driving shaft, a spring for tensioning said wheel on the shaft, a detachable cover for the gear case, a bearing provided in said gear case for supporting a shaft connected at the one end to a speedometer drive shaft, a short shaft journalled in said bearing and a worm meshing with the said worm wheel secured to the other end of said short shaft, the gear case being further provided with fixing studs passing through holes in the cover, the hole in one corner diagonally opposite to the bearing for the worm shaft being circular, while the other holes in the cover are in the form of arcuate slots, the said circular hole forming the center for such arcs, and a detachable bracket on the detachable cover, the said bracket being provided with a longitudinal hole, a screw extending through said hole and screwed in a boss on the cover for fixing the bracket and said bracket further provided with a circular hole arranged over one of the arcuate holes in the cover.

In testimony whereof I have signed my name to this specification.

FRIDOLV HERMAN LUNDGREN.